(12) United States Patent  (10) Patent No.: US 8,433,848 B1
Naamad et al.  (45) Date of Patent: Apr. 30, 2013

(54) ANALYSIS TOOL FOR A MULTI-TIER STORAGE ENVIRONMENT

(75) Inventors: Amnon Naamad, Brookline, MA (US); Lee Sapiro, Hudson, MA (US); John Lefferts, Sutton, MA (US); Marik Marshak, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 407 days.

(21) Appl. No.: 12/798,097

(22) Filed: Mar. 30, 2010

(51) Int. Cl.
*G06F 12/00* (2006.01)

(52) U.S. Cl.
USPC .......................................................... 711/114

(58) Field of Classification Search .................... 711/114
See application file for complete search history.

(56) References Cited

U.S. PATENT DOCUMENTS

| | | | |
|---|---|---|---|
| 5,206,939 | A | 4/1993 | Yanai et al. |
| 5,742,792 | A | 4/1998 | Yanai et al. |
| 5,778,394 | A | 7/1998 | Galtzur et al. |
| 5,845,147 | A | 12/1998 | Vishlitzky et al. |
| 5,857,208 | A | 1/1999 | Ofek |
| 6,912,635 | B2 * | 6/2005 | Patterson et al. ............ 711/165 |
| 2006/0069887 | A1 | 3/2006 | LeCrone et al. |
| 2009/0070541 | A1 | 3/2009 | Yochai |

OTHER PUBLICATIONS

U.S. Appl. No. 11/823,156, filed Jun. 27, 2007, Burke, et al.
U.S. Appl. No. 11/823,152, filed Jun. 27, 2007, Burke.
U.S. Appl. No. 11/903,869, filed Sep. 25, 2007, Veprinsky, et al.
U.S. Appl. No. 12/586,837, filed Sep. 29, 2009, LeCrone, et al.
U.S. Appl. No. 12/592,988, filed Dec. 7, 2009, Martin, et al.
"EMC CLARiiON Virtual Provisioning, Applied Technology," EMC Corporation, White paper, Aug. 2008, 16 pp.
"EMC Symmetrix Virtual Provisioning, Applied Technology," EMC Corporation, White paper, Jun. 2008, 12 pp.
"Implementing Virtual Provisioning on EMC Symmetrix DMX with VMware Virtual Infrastructure," EMC Corporation, White paper, 2008, 30 pp.

\* cited by examiner

*Primary Examiner* — Midys Rojas
(74) *Attorney, Agent, or Firm* — Muirhead and Saturnelli, LLC

(57) ABSTRACT

Storage requirements of one or more applications may be serviced by a mix of different disk technologies across one or more storage tiers. According to the system described herein, desirable or optimal mixes of the different disks may be determined and used in the efficient and cost-effective modification or upgrade of storage arrays. For example, whereas SATA drives may be the most cost effective per gigabyte of storage, some applications may not be able to operate based on SATA performance characteristics. On the other hand, flash drives, which may have high performance characteristics, may be too expensive to be used exclusively in a storage array. The system described herein provides a tool that allows for optimal planning of storage resources in a multi-tier storage environment responsive to workload data of a storage array and based on performance characteristics and costs of the storage resources.

20 Claims, 19 Drawing Sheets

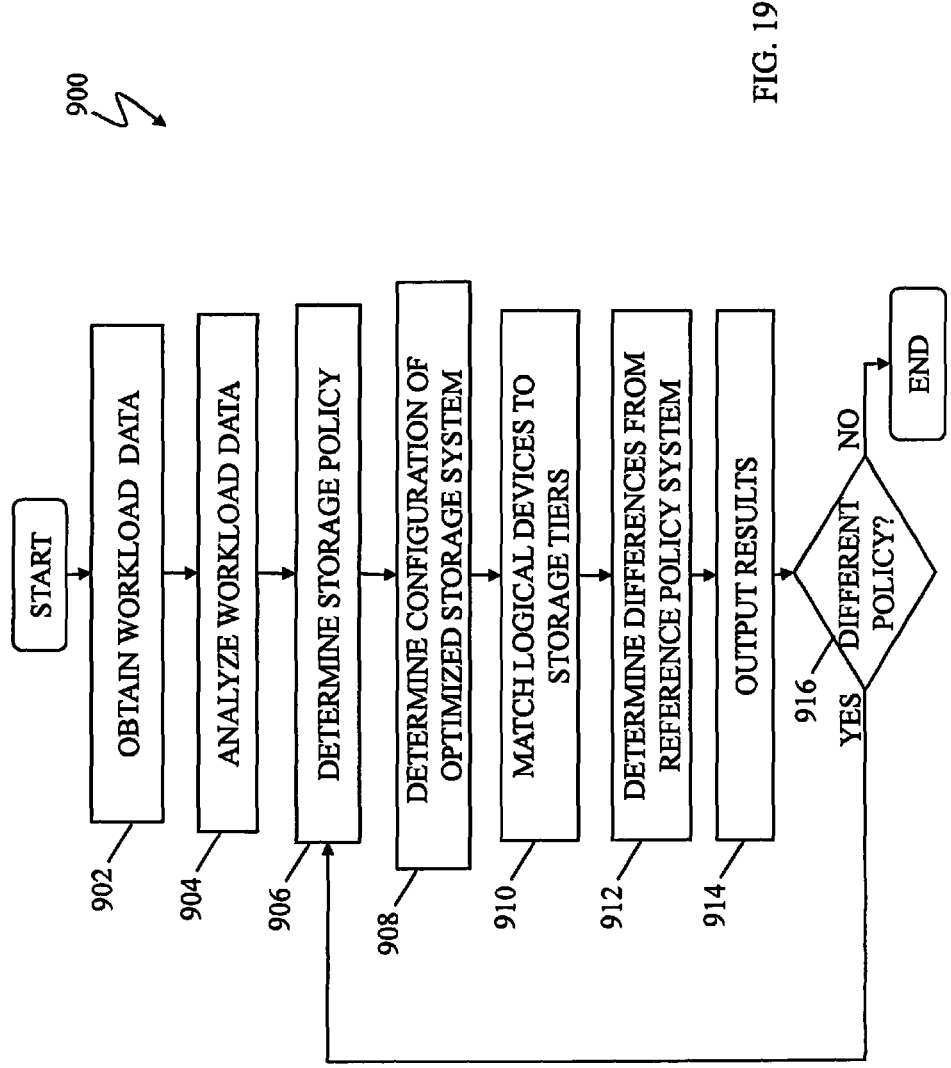

ANALYSIS TOOL FOR A MULTI-TIER STORAGE ENVIRONMENT

TECHNICAL FIELD

This application relates to storage devices and, more particularly, to the field of data management of data stored on storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Data striping is a technique of segmenting logically sequential data so that segments can be assigned to multiple disk drives or other physical devices in a round-robin fashion and thus written concurrently. Data striping may be used in connection with RAID (redundant array of independent disks) storage systems and may be useful in situations where a processor is capable of reading or writing data faster than a single disk can supply or accept it. Specifically, in connection with accessing data that has been striped, while one data segment is being transferred from the first disk, a second disk can locate the next segment. Known management systems allow for the adjustment of the coarseness of the striping pattern and data striping may be used separately from or in conjunction with data mirroring techniques. Advantages of striping include improvements in performance and throughput.

Logical devices containing the data that has been stored across multiple disk drives may be accessed at different frequencies. Access density is the ratio of performance, measured in I/Os per second, to the capacity of a disk drive, e.g., measured in gigabytes (Access Density=I/Os per second per gigabyte). Increasing capacity of a disk drive, without a corresponding improvement in performance at the drive level, creates a performance imbalance that may be characterized by the access density. In attempts to maintain acceptable performance levels as disks get larger, allocation levels within disks may be used that lead to inefficient utilization of the disks. That is, end-users may allocate less space per disk drive to maintain performance levels and may add more disk drives to support increased activity levels and capacity. These actions may add costs to the infrastructure and/or to operational expenses. Access density may be significant factor in managing storage system performance and the tradeoffs of using higher-capacity disks may be carefully evaluated in view of the possibility of lowering access performance versus adding higher performance disk drives that may be expensive. Users may balance performance, capacity and costs when considering how and whether to replace and/or modify a storage array.

Accordingly, it would be desirable to provide a system that may advantageously facilitate the optimization of performance, capacity and cost characteristics of storage resources in a multi-tier storage environment.

SUMMARY OF THE INVENTION

According to the system described herein, a method of analyzing storage management in a multi-tier storage environment includes obtaining workload data of a storage array under analysis. The workload data may be analyzed. A configuration of storage tiers of an optimized storage array may be determined. Logical devices corresponding to the workload data may be matched to the storage tiers of the optimized storage array. Performance characteristics of the optimized storage array may be determined. Analyzing the workload data may include determining a percentage of input/output (I/O) operations that are executed by a percentage of the logical devices. The percentage of I/O operations and the percentage of logical devices determined may conform to the Pareto principle. Analyzing the workload data may be performed iteratively. Determining the configuration of storage tiers of the optimized storage array may include applying a storage policy. The performance characteristics of the optimized storage array may be determined with respect to a reference storage array. The performance characteristics of the optimized storage array may be displayed. The storage tiers of the optimized storage array may include different types of storage disk drives. Analyzing the workload data may include determining a peak ratio of average I/Os per second to service time.

According further to the system described herein, a computer readable storage medium stores computer software that analyzes storage management in a multi-tier storage environment. The computer software includes executable code that obtains workload data of a storage array under analysis. Executable code may be provided that analyzes the workload data. Executable code is provided that determines a configuration of storage tiers of an optimized storage array. Executable code may be provided that matches logical devices corresponding to the workload data to the storage tiers of the optimized storage array. Executable code may be provided that determines performance characteristics of the optimized storage array. The executable code that analyzes the workload data may include executable code that determines a percentage of input/output (I/O) operations that are executed by a percentage of the logical devices. The percentage of I/O operations and percentage of logical devices conforms to the Pareto principle. Analyzing the workload data may be performed iteratively. the executable that determines the configuration of storage tiers of the optimized storage array includes executable code that applies a storage policy. The performance characteristics of the optimized storage array may be determined with respect to a reference storage array. Executable code may be provided that displays the performance characteristics of the optimized storage array. The storage tiers of the optimized storage array may include different types of storage disk drives. Executable code that analyzes the workload data may include executable code that determines a peak ratio of average I/Os per second to service time.

According further to the system described herein, a method for providing an optimized storage array includes determining a configuration of storage tiers of the optimized storage array based on workload data from a storage array under analysis and according to a storage policy. Logical devices corresponding to the workload data may be matched to the storage tiers of the optimized storage array. Performance of the optimized storage array may be analyzed. The performance of the optimized storage array may be analyzed in comparison to a reference storage array.

BRIEF DESCRIPTION OF THE DRAWINGS

Embodiments of the system are described with reference to the several figures of the drawings, which are briefly described as follows.

FIG. 19 is a flow diagram showing multi-tier storage array management processing according to an embodiment of the system described herein.

DETAILED DESCRIPTION OF VARIOUS EMBODIMENTS

Figure 1:
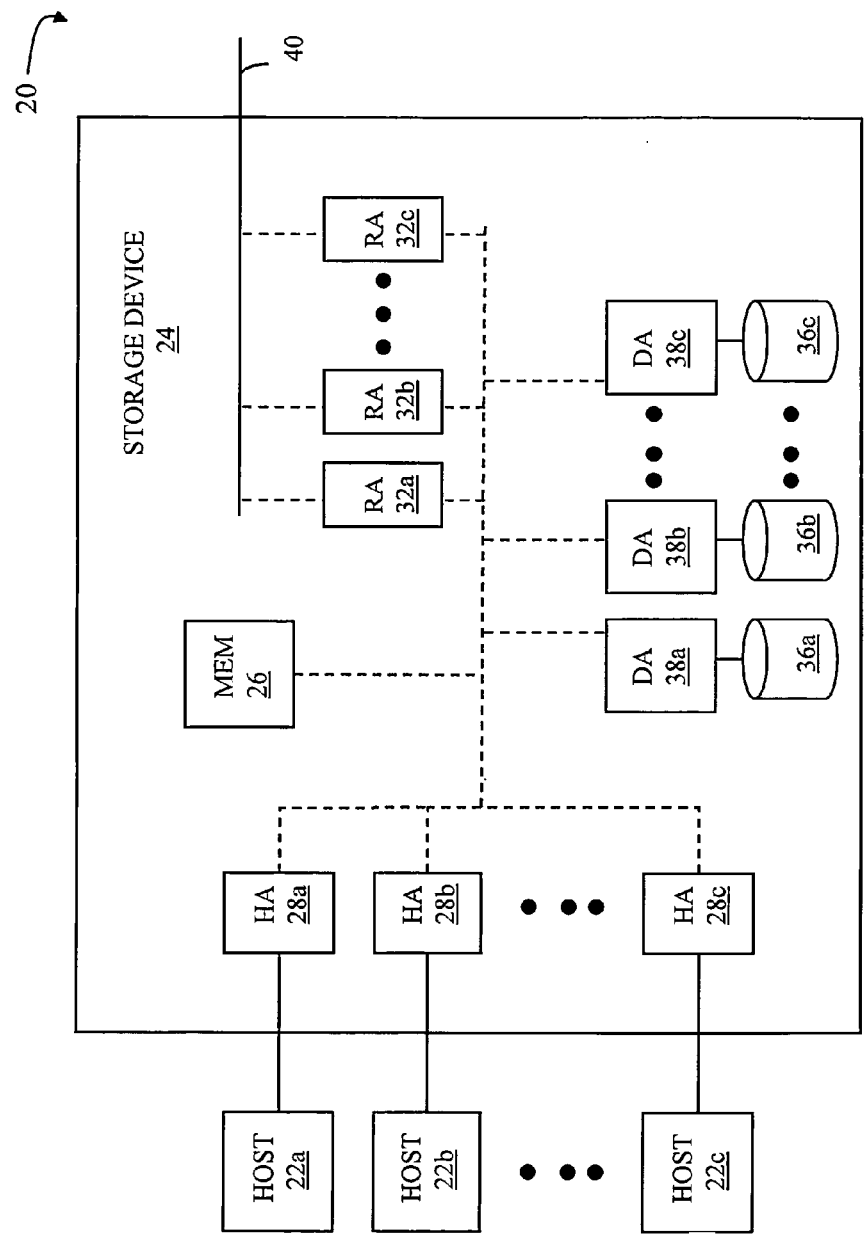
FIG. 1 is a schematic diagram showing a plurality of hosts and a data storage device that may be used in connection with the system described herein.

FIG. 1 is a schematic diagram 20 showing a plurality of hosts $22a$-$22c$ coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) $28a$-$28c$ that handle reading and writing of data between the hosts $22a$-$22c$ and the storage device 24. Although the diagram 20 shows each of the hosts $22a$-$22c$ coupled to each of the HA's $28a$-$28c$, it will be appreciated by one of ordinary skill in the art that one or more of the HA's $28a$-$28c$ may be coupled to other hosts.

The storage device 24 may include one or more Remote Data Facility (RDF) adapter units (RA's) $32a$-$32c$. An RDF product, such as a Symmetrix® product or other RDF product produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's $32a$-$32c$ are coupled to an RDF link 40 and are similar to the HA's $28a$-$28c$, but are used to transfer data between the storage device 24 and other storage devices (see FIG. 3 and corresponding description) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Patent App. Pub. No. 2006-0069887 to LeCrone, et al., entitled "Triangular Asynchronous Replication," which are incorporated herein by reference.

The storage device 24 may also include one or more disks $36a$-$36c$, each containing a different portion of data stored on the storage device 24. Each of the disks $36a$-$36c$ may be coupled to a corresponding one of a plurality of disk adapter units (DA) $38a$-$38c$ that provides data to a corresponding one of the disks $36a$-$36c$ and receives data from a corresponding one of the disks $36a$-$36c$. The disks $36a$-$36c$ may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks $36a$-$36c$ may be subdivided into a plurality of volumes or logical devices. The logical devices may or may not correspond to the physical storage space of the disks $36a$-$36c$. Thus, for example, the disk $36a$ may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
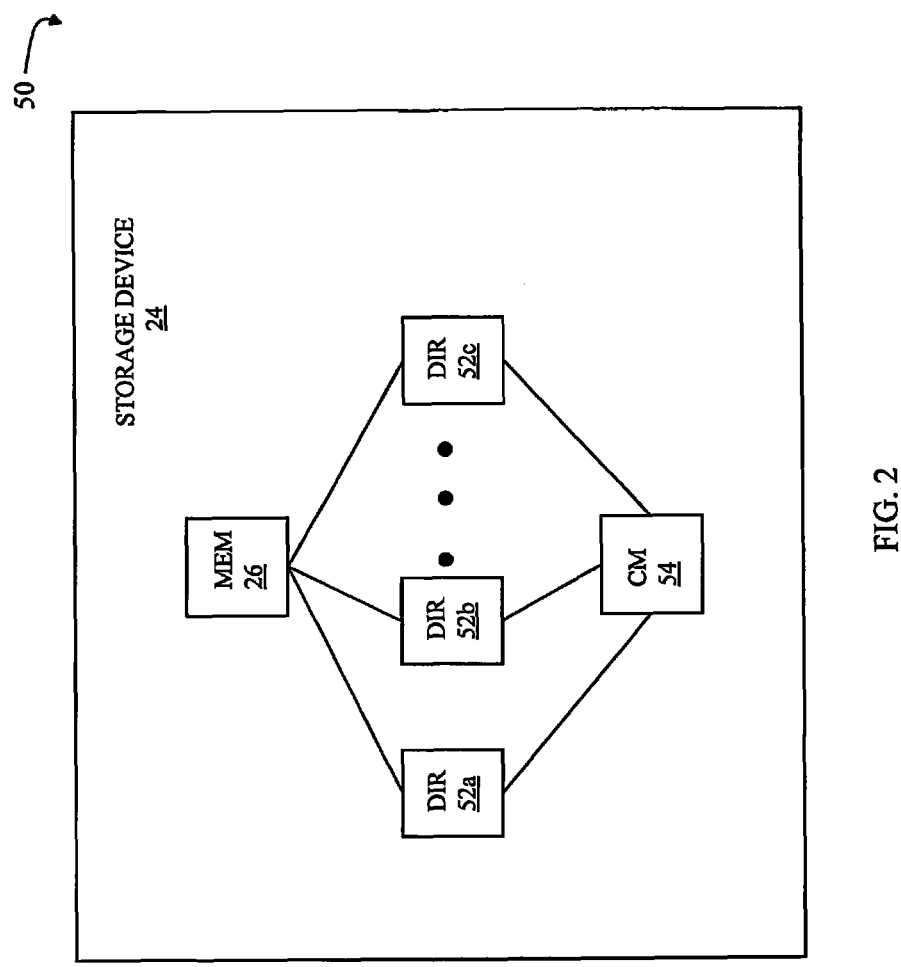
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
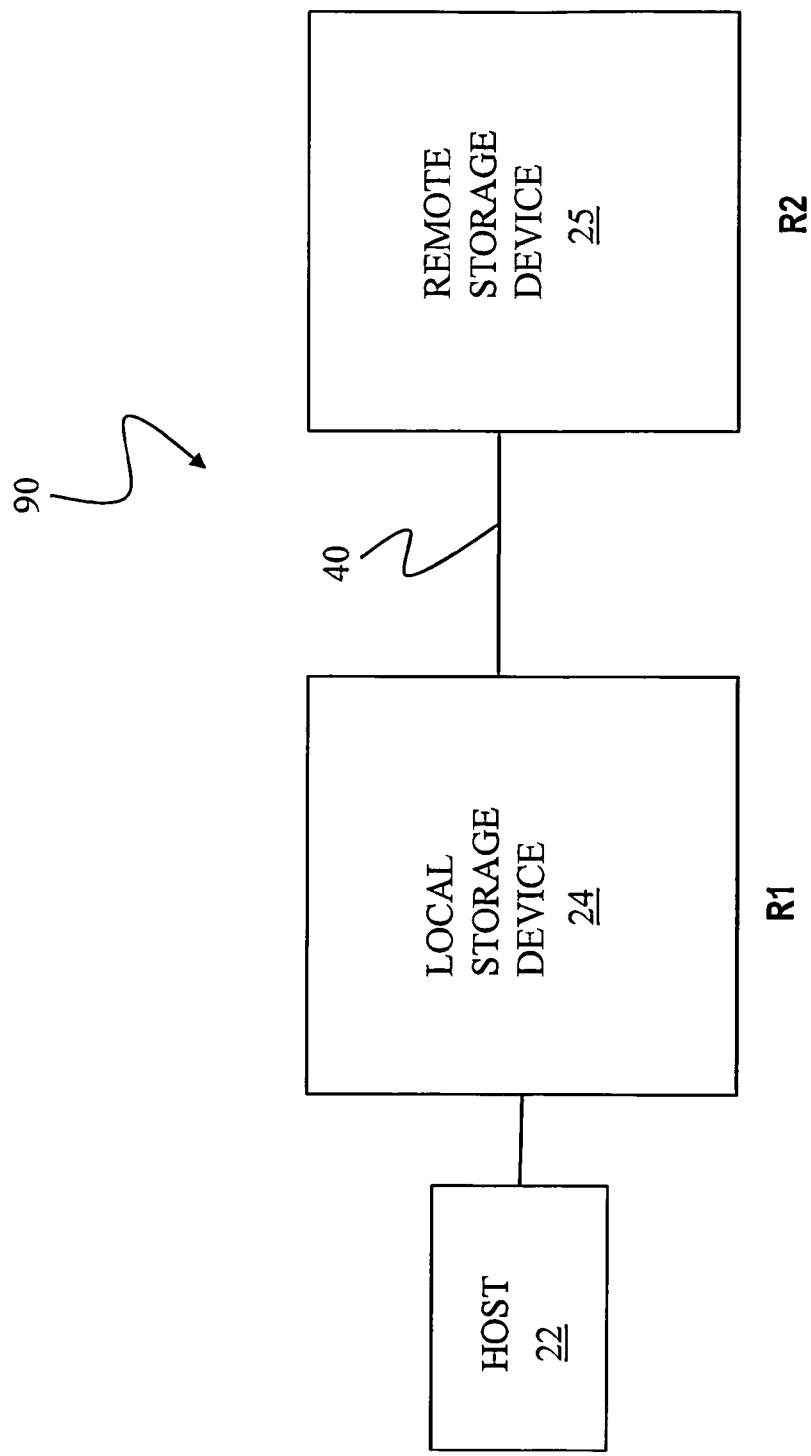
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the RDF link 40. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the RDF link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein.

In an embodiment, the system described herein may be used in connection with SRDF synchronous (SRDF/S) transfers. For an SRDF/S transfer, data written from one of the hosts 22a-22c to the local storage device 24 may be stored locally, for example on one of the data volumes 36a-36c of the local storage device 24. After data is written from one or more of the hosts 22a-22c to the local storage device 24, the data is transferred from the local storage device 24 to the remote storage device 25 using RDF. Receipt by the remote storage device 25 is then acknowledged to the local storage device 24 which then provides an acknowledge back to the appropriate one of the hosts 22a-22c for the initial write. In other embodiments, the system described herein may also be used in connection with, or in combination with, other modes of data transfer including, for example, asynchronous (SRDF/A) transfers and/or other appropriate data transfer systems and devices.

Figure 4:
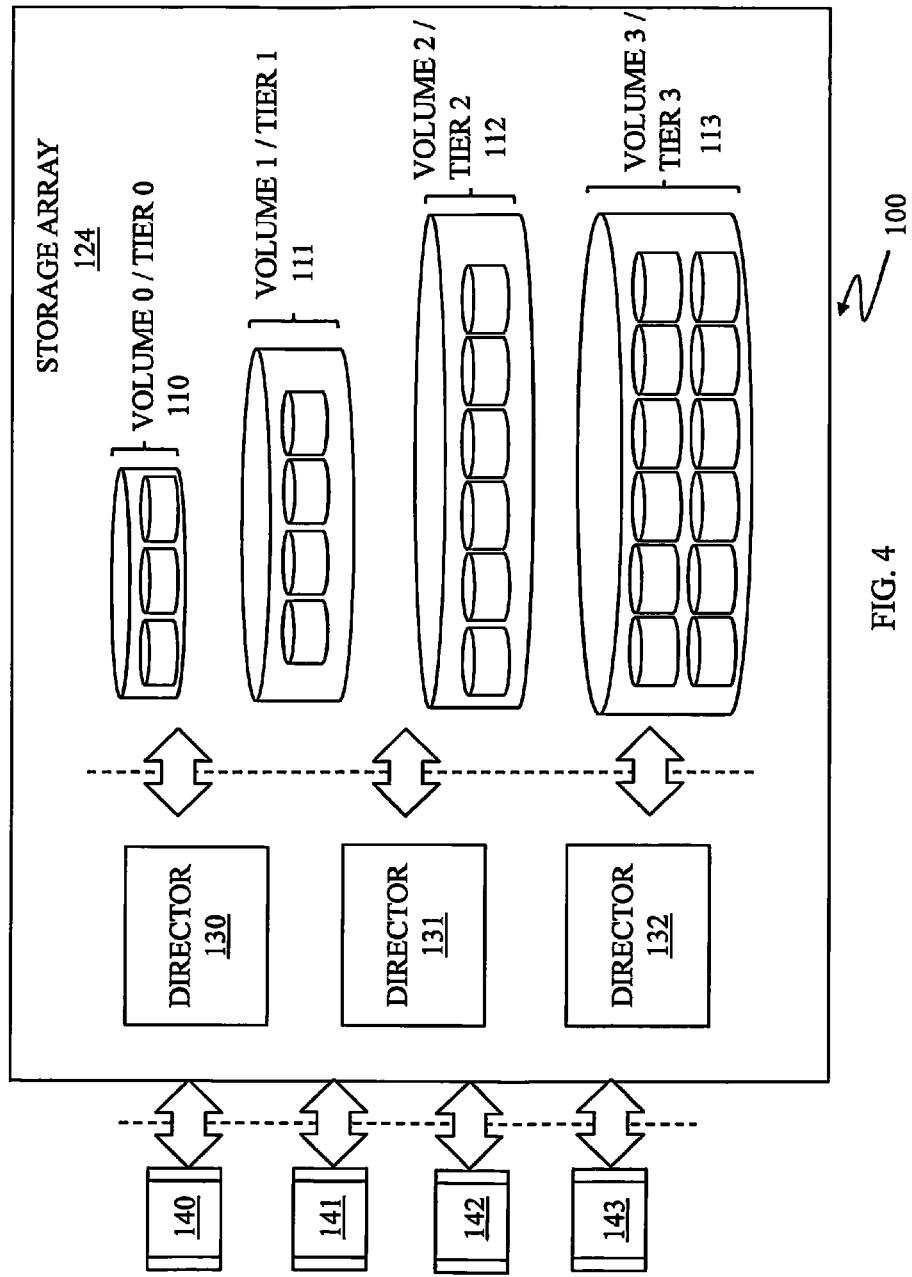
FIG. 4 is a schematic illustration showing a storage array according to an embodiment of the system described herein.

FIG. 4 is a schematic illustration showing a storage system 100 that may be used in connection with an embodiment of the system described herein. The storage system 100 may include a storage array 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Generally, a tier may represent a set of storage resources residing in a storage platform and may also be referred to herein as a storage type. Examples of storage disks that may be used as storage resources within a storage array of a tier may include sets of Serial Advanced Technology Attachment (SATA) disks, Fibre Channel (FC) disks and/or Enterprise Flash Disk (EFD) disks, among other known types of storage disks. Techniques involving the management of data between volumes on multiple storage tiers and/or between multiple storage tiers within a single volume are described, for example in: U.S. Ser. No. 12/586,837 to LeCrone et al., filed Sep. 29, 2009, entitled "Sub-Tiering Data At The Volume Level"; and U.S. Ser. No. 12/592,988 to Martin et al., filed Dec. 7, 2009, entitled "Normalizing Capacity Utilization Within Virtual Storage Pools", which are incorporated herein by reference.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs.

Figure 5A:
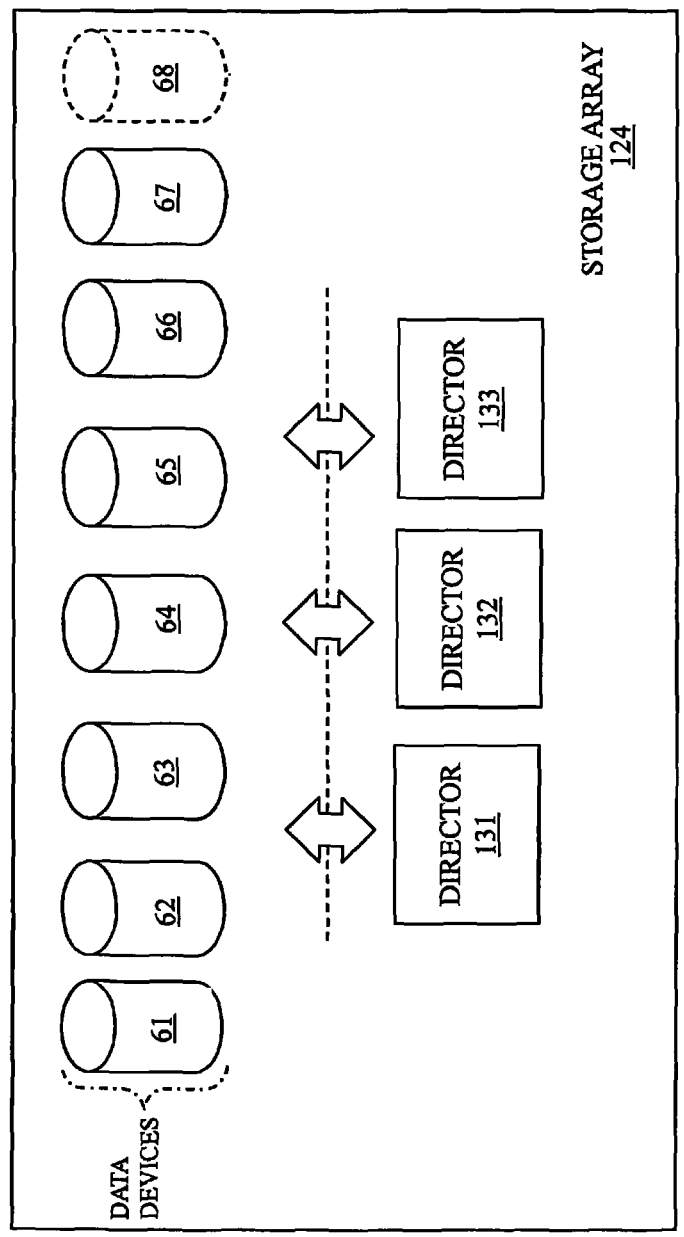
FIGS. 5A and 5B are schematic diagrams showing the storage array as including one or more data devices according to an embodiment of the system described herein.

FIG. 5A is a schematic diagram showing the storage array 124 as including a plurality of data devices 61-68 communicating with directors 131-133. The data devices 61-68 may be implemented as logical devices like standard logical devices provided in a Symmetrix® data storage device produced by EMC Corporation of Hopkinton, Mass., for example. The data device 68 is illustrated with broken lines to indicate that the data device 68 does not yet exist but may be created, as further discussed elsewhere herein. In some embodiments, the data devices 61-67 may not be directly useable (visible) to hosts coupled to the storage array 124. Each of the data devices 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-68 may be sections of one data device.

Figure 5B:
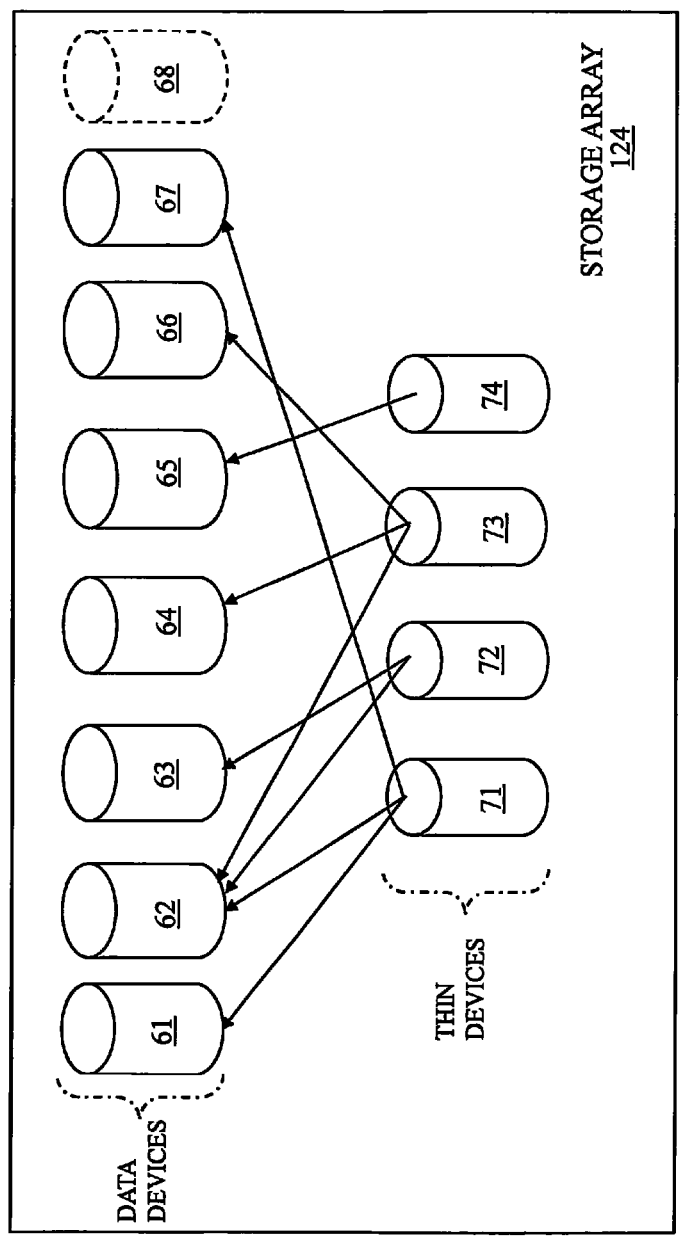

Optionally, as shown in FIG. 5B, the storage array 124 may also include a plurality of thin devices 71-74 that may be adapted for use in connection with the system described herein when using thin provisioning (for a general discussion of thin provisioning techniques, see, for example, U.S. Patent App. Pub. No. 2009/0070541 A1 to Yochai et al., entitled "Automated Information Life-Cycle Management With Thin Provisioning," which is incorporated herein by reference). In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof).

Figure 6:
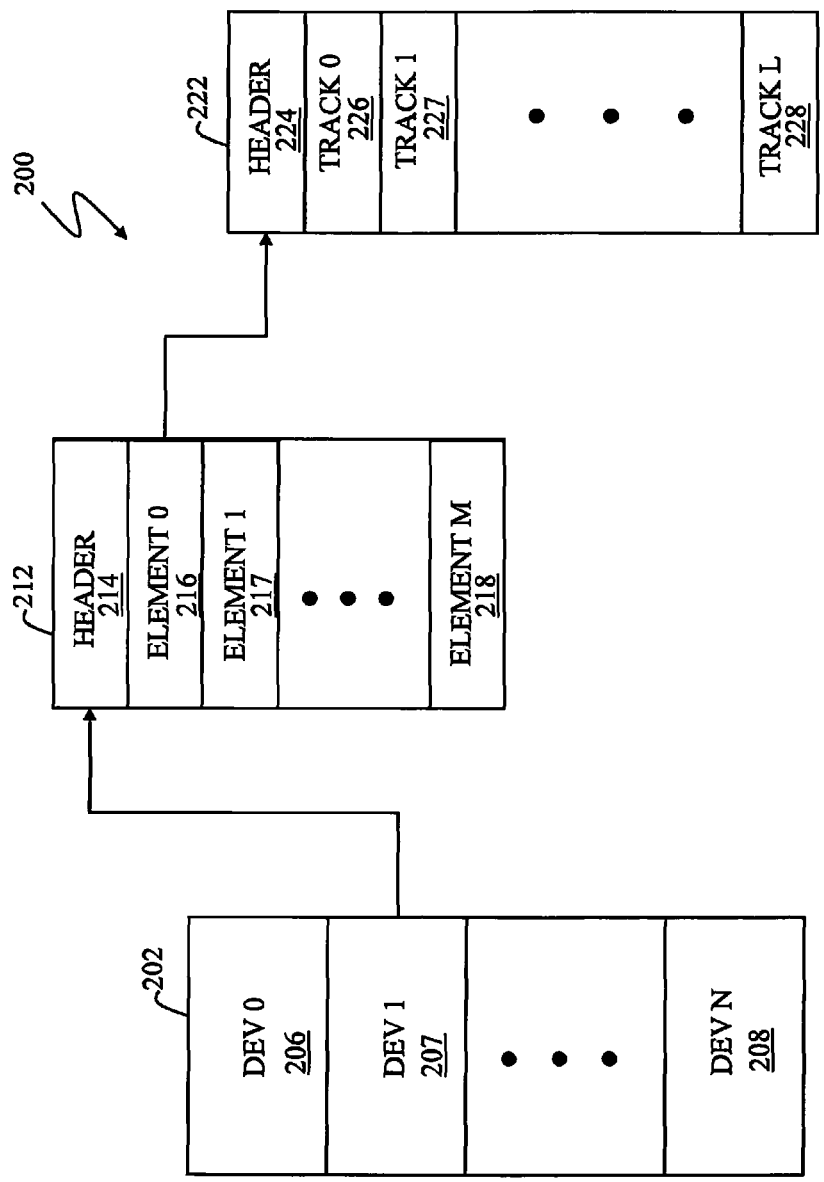
FIG. 6 is a schematic diagram illustrating tables that are used to keep track of device information in connection with an embodiment of the system described herein.

FIG. 6 is a diagram 200 illustrating tables that are used to keep track of device information in connection with an embodiment of the system described herein. A first table 202 corresponds to all of the devices in a storage array used by a storage device or by an element of a storage device, such as an HA and/or a DA. The table 202 includes a plurality of logical device (logical volume) entries 206-208 that correspond to all the logical devices used by the storage device (or portion of the storage device). The entries in the table 202 may include information for data devices, for standard logical devices, for virtual devices, for business continuance volume (BCV) devices, and/or any or all other types of logical devices used in connection with the system described herein.

Each of the entries 206-208 of the table 202 correspond to another table that may contain information for one or more sections of a logical volume. For example, the entry 207 may correspond to a device table 212. The device table 212 may include a header 214 that contains overhead information, such as information identifying the corresponding device, information concerning the last used data device and/or other information including counter information, such as a counter that keeps track of used group entries (described below). The header information, or portions thereof, may be available globally to the storage device 24.

The device table 212 may include one or more group elements 216-218, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 216-218 (for example, the group element 216) of the device table 212 may identify a particular one of the data devices 61-67 having a track table 222 that contains further information, such as a header 224 having overhead information and a plurality of entries 226-228 corresponding to each of the tracks of the particular one of the data device sections 61-67. The information in each of the entries 226-228 may include a pointer (either direct or indirect) to the physical address on one of the disk drives 36a-36c of the storage device 24 (or a remote storage device 25 if the system is so configured) that maps to the logical address(es) of the particular one of the data devices 61-67. Thus, the track table 222 may be used in connection with mapping logical addresses of the logical device sections corresponding to the tables 202, 212, 222 to physical addresses on the disk drives 36a-36c of the storage device 24.

The tables 202, 212, 222 may be stored in the global memory 26 of the storage device 24. In addition, the tables corresponding to particular logical device sections accessed by a particular host may be stored (cached) in local memory of the corresponding one of the HA's 28a-28c. In addition, the RA's 32a-32c and/or the DA's 38a-38c may also use and locally store (cache) portions of the tables 202, 212, 222.

Figure 7:
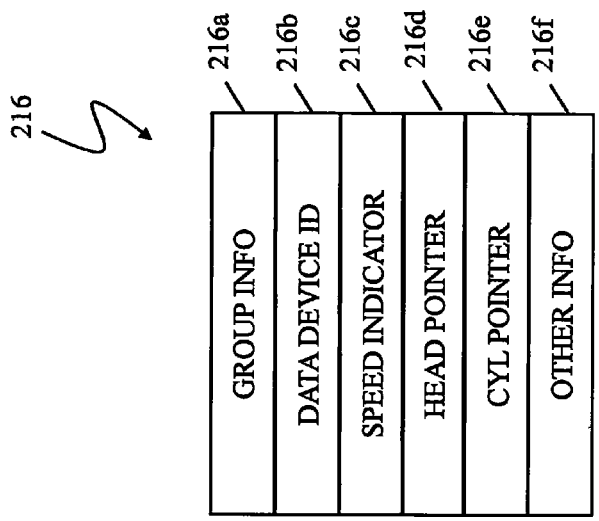
FIG. 7 is a schematic diagram illustrating a group element of the device table in connection with an embodiment of the system described herein.

FIG. 7 is a schematic diagram illustrating a group element 216 of the device table 212 in connection with an embodiment of the system described herein. The group element 216 may includes a plurality of entries 216a-216f. The entry 216a may provide group information, such as a group type that indicates whether there has been physical address space allocated for the group. The entry 216b may include information identifying one (or more) of the data devices 61-67 that correspond to the group (i.e., the one of the data devices 61-67 that contain pointers for physical data for the group). The entry 216c may include other identifying information for the one of the data devices 61-67, including a speed indicator that identifies, for example, if the data device is associated with a relatively fast access physical storage (disk drive) or a relatively slow access physical storage (disk drive). Other types of designations of data device sections are possible (e.g., relatively expensive or inexpensive, RAID protection level, numbered of mirrored copies, etc.). The entry 216d may be a pointer to a head of the first allocated track for the one of the data devices 61-67 indicated by the ID entry 216b. Alternatively, the entry 216d may point to header information of the data device track table 222 immediately prior to the first allocated track. The entry 216e may identify a cylinder of a first allocated track for the one the data devices 61-67 indicated by the ID entry 216b. The entry 216f may contain other information corresponding to the group element 216 and/or the corresponding device. In other embodiments, entries of the group table 216 may identify a range of cylinders of the device and a corresponding mapping to map cylinder/track identifiers for the device to tracks/cylinders of a storage area. In an embodiment, the size of the group element 216 may be eight bytes.

Figure 8:
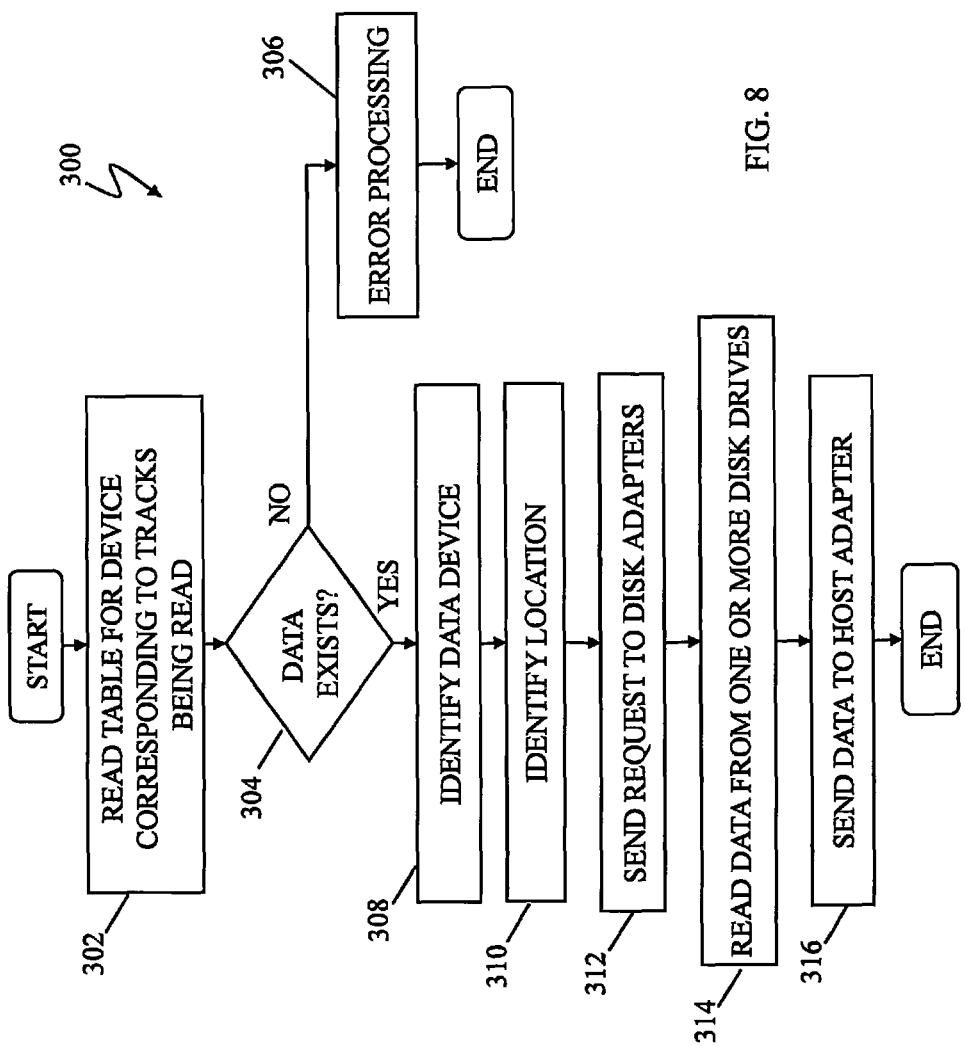
FIG. 8 is a flow diagram illustrating processing for handling a read of one or more logical tracks of one of the devices according to an embodiment of the system described herein.

FIG. 8 is a flow diagram 300 illustrating processing for handling a read of one or more logical tracks of one of the devices 61-67 in accordance with an embodiment of the system described herein. In a step 302, an appropriate one of the host adapters 28a-28c reads the group table 212 corresponding to the logical tracks being read. After the step 302, at a test step 304, it is determined whether the logical tracks identified from the group table 212 corresponds to any of the data devices 61-67 (i.e., if there is physical data corresponding to the logical tracks being read). If there is no corresponding physical data (meaning that no logical track(s) were ever written), then processing proceeds to a step 306 where error processing is performed, such as returning a NULL value to the host. Other appropriate error processing may be performed at the step 306. After the step 306, processing is complete.

If it is determined at the step 304 that there is physical data corresponding to the logical tracks being read, then processing proceeds to a step 308 where one or more of the data devices 61-67 associated with the logical tracks being read are identified from the group table 212. After the step 308, processing proceeds to a step 310 where the track table 222 is read from the identified one or more of the data devices 61-67 and the corresponding location of the physical data (i.e., cylinder and track) is determined. Logical storage space maps to physical storage space of the physical devices. After the step 310, processing proceeds to a step 312 where a request may be sent to one or more disk adapters 38a-38c corresponding to disk drives 36a-36c that provide the physical storage space associated with the identified one of the data devices 61-67 and corresponding location information. After the step 312, processing proceeds to a step 314 where the physical data is read. Note that the data may be stored in a cache or other memory (for example, the memory 26) in connection with being read. In some cases, if the data being read is already in the cache, then the processing at the step 812 and following steps may not be necessary. Note also that reading the data may include updating any metadata used to provide the processing described herein, such as the time last accessed, the host/user making the request, frequency of use, and/or any other appropriate metric. After the step 314, processing proceeds to a step 316 where the data may be received by an appropriate one of the host adapters 28a-28c (e.g., by reading the memory 26). After the step 316, processing is complete.

Figure 9:
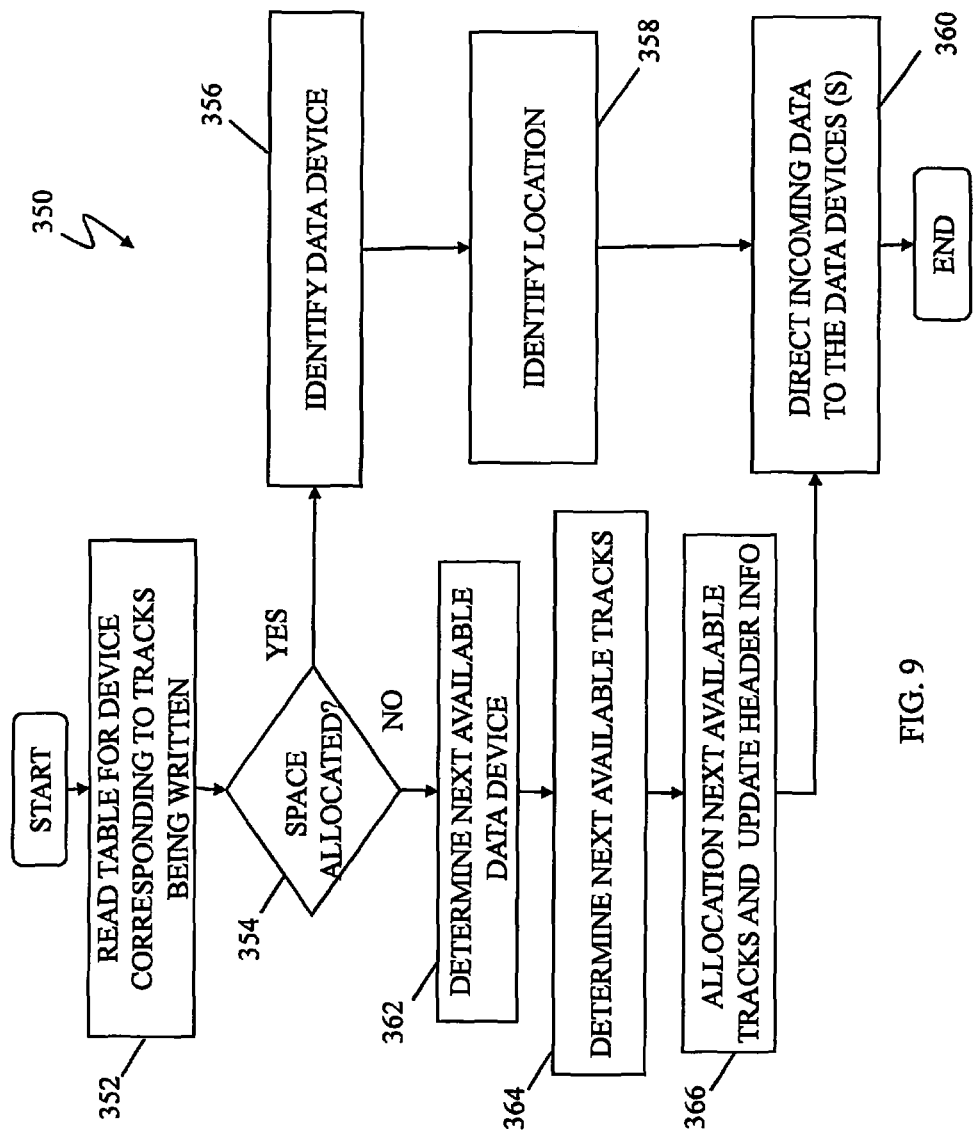
FIG. 9 is a flow diagram illustrating processing for handling a write of logical tracks to one or more of the devices in connection with the system described herein.

FIG. 9 is a flow diagram 350 illustrating processing for handling a write of logical track(s) to one or more of the device(s) 61-67 in connection with an embodiment of the system described herein. At a step 352, an appropriate one of the host adapters 28a-28c reads the group table 212 of the one or more of the devices 61-67 corresponding to the logical tracks being written.

Following the step 352 is a test step 354 where it is determined whether physical space had been previously allocated (i.e., in a prior write operation) for the tracks being written. If so, then processing proceeds to a step 356 where the data device that includes the tracks is identified. After the step 356, is a step 358 where the track table 222 is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to logical storage space of the data devices. Following the step 358 processing proceeds to a step 360 where the data being written is directed to the appropriate physical storage space. As further discussed elsewhere herein, data may be written among multiple devices in a striping process in which data is advantageously striped across the multiple devices. After the step 360, processing is complete.

If it is determined at the step 354 that there is no physical storage that has been allocated for the logical track(s) being written, then control transfers to a step 362, where a next available data device identifier (i.e., the data device 68) is determined. This information may be obtained from the header 214 of the device table 212.

After the step 362, processing proceeds to a step 364 where available physical storage space on the disk drives 36a-36c is determined. In an embodiment herein, available physical storage space is allocated sequentially from one or more of the disk drives 36*a*-36*c*. Following the step 364 is a step 366 where a request may be sent to a disk adapter 38*a*-38*c* (or possibly the RA's 32*a*-32*c*) to allocate the physical storage space for the write. Also at the step 366, header info is updated to reflect the newly allocated data device and physical tracks. After the step 366, processing proceeds to the step 360, discussed above, where the data being written is directed to the one or more data device sections. After the step 360, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the device table 212 (for example, the entry 216*f* of the group element 216). Alternatively, the data characteristic information may be stored in a memory, such as the global memory 26 of the storage device 24, and a pointer to this information stored in the group element 216. Other implementations for storing and access of the data characteristic information are possible.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple storage volumes. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the data device 60 may be a metavolume of concatenated volumes/devices, as further discussed elsewhere herein.

Figure 10:
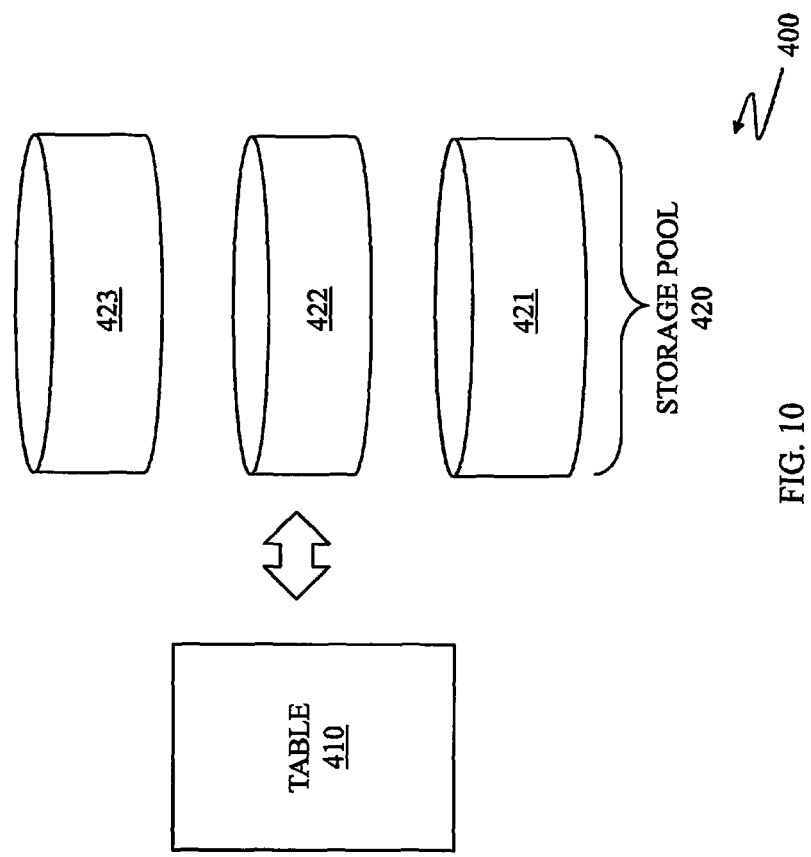
FIG. 10 is a schematic illustration of a storage array that may be used in connection with an embodiment of the system described herein.

FIG. 10 is a schematic illustration of a storage array used in connection with an embodiment of the system described herein. A table 410, like the table 202 discussed elsewhere herein, may map data stored in multiple logical devices to multiple storage volumes 421-423 forming a storage pool or array 420. As discussed elsewhere herein, each of the volumes 421-423 may include one or more data devices, like the data devices 61-68 discussed elsewhere herein, that map to physical storage areas. The volumes 421-423 may be part of one or more storage devices like that further discussed elsewhere herein. It is noted that in various embodiments the table 410 may be stored in a global memory of the storage array and/or in a memory of a separate device, among other appropriate storage locations of the table 410.

Figure 11:
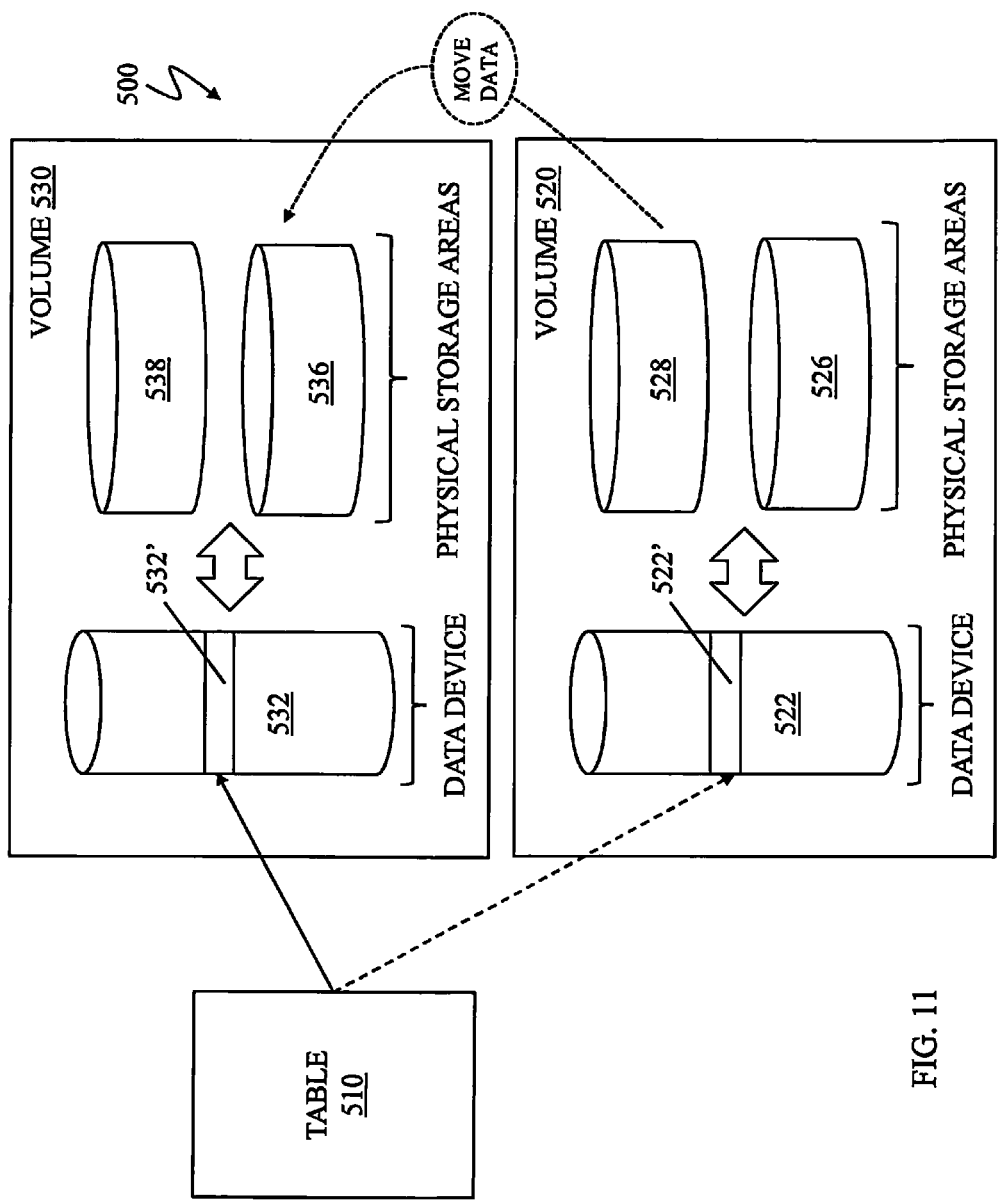
FIG. 11 is a schematic illustration showing a storage device in connection with movement of data in a process that may be used in connection with an embodiment of the system described herein.

FIG. 11 is a schematic illustration showing an embodiment of a storage array 500 described in connection with movement of data from one storage area to a different storage area according to an embodiment of the system described herein.

The storage system 500 may include a table 510, like the table 202 discussed elsewhere herein, and one or more volumes 520, 530. Each of the volumes 520, 530 may include a data device 522, 532 associated with respective physical storage areas 526, 528, 536, 538. Note that, in various embodiments, the table 510 may be incorporated into memories one or more of the volumes 520, 530 and/or be stored in a device that is separate therefrom, among other appropriate storage locations of the table 510. In connection with moving data from the volume 520 to the volume 530, the table 510 may be modified to point to map to the new location of the data on the physical storage areas 536, 538 of the volume 530.

Figure 12:
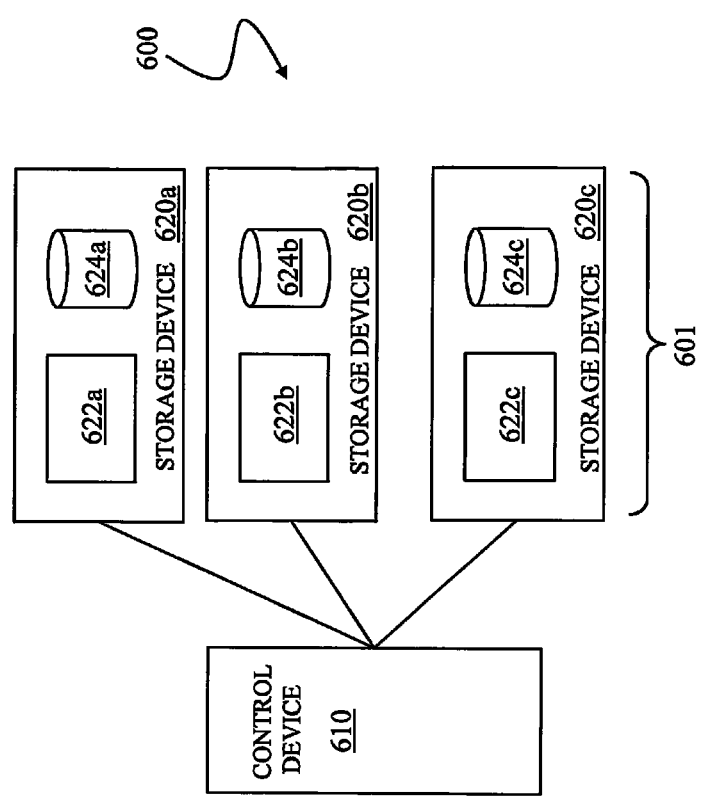
FIG. 12 is a schematic illustration of an embodiment of a storage array that may be used in connection with an embodiment of the system described herein.

FIG. 12 is a schematic illustration of an embodiment of a storage system 600 that may be used in connection with the system described herein. For example, the storage system 600 may be a RAID system. The storage system 600 is shown to include storage devices 620*a-c*, that may each include at least one director 622*a-c* coupled to at least one volume 624*a-c*, like that further discussed elsewhere herein, and that together form a storage pool or array 601. A control device 610 may be provided that is in communication with storage devices 620*a-c*. The control device 610 may include device mapping information, like the tables 410, 510 discussed above, and other components to perform functions of the system described herein, including, for example, one or more devices to collection utilization and/or performance statistics of the storage devices and processors to process received information, as further discussed elsewhere herein.

It is noted that in various embodiments of RAID systems, one or more of the storage devices 620*a-c* may be a parity device that is used in connection with error correction capability of the RAID system including the use of parity information that is stored on the parity device. Alternatively, it is also noted that parity information may be stored across the storage devices 620*a-c* rather than being stored in one parity device. Furthermore, in various embodiments, the system described herein may include operations involving communication between the storage devices 620*a-c* of the RAID system to provide mirrored copies of the data blocks replicated across the multiple storage devices and/or operations with portions of the data blocks that are distributed across the multiple storage devices (i.e. striping). Although illustrated with discrete storage devices, in various embodiments, the storage system 600 may include any number of different configurations of disks, disk drives or other storage media coupled to one or more interconnected directors, and it should be noted that other configurations and types of systems involving multiple, redundant storage may be used in connection with the system described herein.

Storage requirements of one or more applications may be serviced by a mix of different disk technologies across one or more storage tiers. According to the system described herein, desirable or optimal mixes of the different disks may be determined and used in the efficient and cost-effective modification or upgrade of storage arrays. For example, whereas SATA drives may be the most cost effective per gigabyte of storage, some applications may not be able to operate based on SATA performance characteristics. On the other hand, flash drives, which may have high performance characteristics, may be too expensive to be used exclusively in a storage array. Thus, it is desirable to provide a tool, as according to the system described herein, that allows for optimal planning of storage resources in a multi-tier storage environment responsive to workload data of a storage array and based on performance characteristics and costs of the storage resources.

Figure 13:
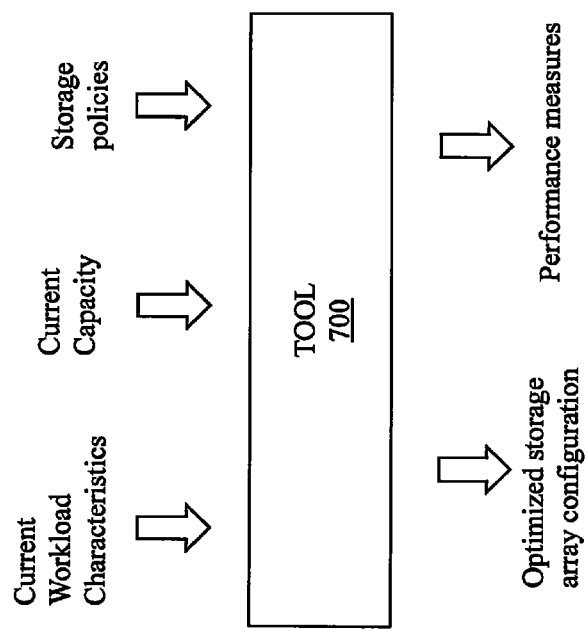
FIG. 13 is a schematic illustration of a tool, utility and/or algorithm according to an embodiment of the system described herein may receive as inputs current disk configuration and workload characteristics and output an optimized storage array configuration and performance measures.

FIG. 13 is a schematic illustration of a tool, utility and/or algorithm 700 according to the system described herein may receive as input current workload characteristics of a system under analysis. Workload characteristics may include, for example, the average number of I/Os per unit time (e.g., seconds), the write percentage, the average amount of data per unit time (e.g., number of MB per second) and the workload skew level. An input to the tool 700 may also include workload capacity information calculated by the number of logical devices and the addressable size of the devices. The workload skew level is a measure of evaluating what percent of the data does what percent of the I/Os, specifically the distribution of I/Os over used capacity. The tool 700 may also accept as input user-defined storage policies that may include user-defined tier usage rules, as further discussed elsewhere herein. Further, the tool 700 may be input with price and cost information for various drive types.

The tool 700 according to the system described may then output an optimized storage array disk configuration and performance measures thereof. Disk configuration is an evaluation of the mix of drive types and may include the percentage of each disk type in the mix and may also include the actual capacity of the disks in the mix. Performance measures may include, for example, response time of the system, throughput, cost and power consumption. In an embodiment as further discussed elsewhere herein, the tool outputs may be used to estimate the performance and cost of mixing different types of disk drive technology within a storage array. The tool 700 may model a desired or optimal storage array configuration automatically and/or may enable a user to interactively experiment with different storage tiers and storage policies until achieving a particular result at a desired cost. The tool 700 may model the number of disk drives for each disk drive technology for configuring a particular tiered-storage array, including facilitating a determination of whether to add storage, upgrade storage and/or replace existing storage to achieve optimal or desired performance and cost effectiveness within a storage environment. The tool 700 according to the system described herein may be used, in particular, with algorithms to optimize the use of different disk types, or storage tiers in a storage array by placing the right data in the right tier at the right time. For example, in an embodiment, the tool 700 may be used in connection with a FAST solution in a Symmetrix® storage array, as further discussed elsewhere herein.

Figure 14:
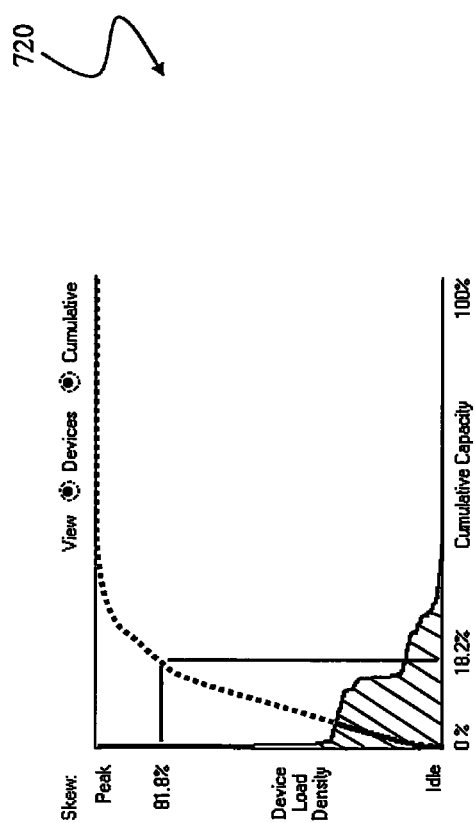
FIG. 14 is a schematic plot showing workload skew according to an embodiment of the system described herein.

FIG. 14 is a schematic plot 720 showing workload skew with cumulative capacity shown on the x-axis and device load density shown on the y-axis according to an embodiment of the system described herein. The plot shows two views of the workload skew: devices and cumulative accesses (shown by a dotted line). In the illustrated plot, the workload skew is 81.8%/18.2% indicating that 81.8% of the I/Os executed are in 18.2% of the used capacity (substantially conforming, for example, to the Pareto principle or the 80/20 rule). It is also noted that statistics used by the tool 700 according to the system described herein may be gathered by the tool itself and/or may be obtained from other sources, such as, for example, data obtained from the EMC Workload Analyzer (WLA) and/or the Symmetrix® CLI statistics collection daemon (STP), among other possible collection devices, applications or tools. Further, the tool 700 may also provide for the manual input of workload characteristics and capacity information.

In an embodiment, the tool 700 according to the system described herein may determine logical devices that should be upgraded to higher performance/higher cost drives, for example, upgraded to flash drives according to the workload skew information. The process may be iterative. For example, in FIG. 13 it is noted that 81.8% of the I/Os are executed in 18.2% of the overall used capacity. Accordingly, the tool may be determine that the 18.2% of the logical drives may be allocated to one or more higher performance/higher cost drives. An similar analysis may then be performed for the remaining drives to determine, of the remaining drives, a relationship of the I/Os executed to a percentage of drives. For example, the determination may again correspond determining the remaining drives that execute approximately 80% of the remaining I/Os. The relationship may again correspond to the Pareto principl—80/20 rule. Once again, the identified devices may be identified as appropriate for upgrading to higher performance/higher cost drives. This analysis may be further repeated in optimizing the storage array.

According to an embodiment, a goal of using the tool 700 according to the system described herein may be to provide a storage array that efficiently and effectively puts busy logical volumes (e.g., identified by logical unit numbers (LUNs)) on higher, faster storage tiers. Based on a high skew level, larger numbers of I/Os may be serviced on the higher storage tiers while balancing such utilization with the cost to obtain the storage resources, e.g., flash drives, of the higher storage tiers in the storage array. The balancing process may also take into account of user-defined storage policies, including, for example, taking into account a change in a designated RAID protection levels. Specifically, the tool 700 according to the system described herein may provide an optimized storage array configuration that also reflects a desired change in RAID protection level. For example, if it is desired to provide an optimized storage array configuration that also includes a change from no RAID level to a RAID level 1 (data mirroring), then the tool 700 may determine an optimized storage array for a system that provides for double the amount of data and workload from that of the current system.

Accordingly, the tool 700 according to the system described herein may be determine an optimization of storage tier drives that may handle desired the desired percentages of the I/Os according to a designated storage policy. The determination may provide for estimating disk usage profiles of an optimized storage array based on storage policies, for example, by consolidating busy logical drives to higher performance drives to optimize drive performance. As further discussed elsewhere herein, for example, tiering decisions of logical devices by the tool 700 may be made in conjunction with data tiering algorithms, including the use of a FAST algorithm or application.

It is also noted that front end accesses are distinguished from back end accesses of the storage array in connection with the system described herein. That is, operation of the system described herein may be based principally on the actual disk drive accesses at the storage array back end rather than accesses at the front end as seen by the requesting host/application. This is because data initially accessed at the back end, i.e. from the disk drives, may then be stored in a cache, that has a fast access speed, in connection with servicing a host's request at the front end of the storage array. The cache may not be emptied immediately such that recently-accessed data may stay in the cache for future access operations by the host without causing subsequent access operations at the back end of the storage array with the actual disk drives. Use of the cache in this manner would affect determinations of number of I/O operations, since, for example, data that is accessed frequently from the cache might appear as if it is not accessed frequently from the back end of the system, e.g., the data was accessed once at the beginning of the day from the disk drives and thereafter accessed by the host from the cache. As discussed, the system described herein is principally directed to balancing the performance and costs of disk drives at the back end of a multi-tiered storage array.

As further discussed elsewhere herein, access density is the ratio of performance, measured in I/Os per second, to the capacity of the drive, e.g., measured in gigabytes (Access Density=I/Os per second per gigabyte). Storage disks may be analyzed according to the system described herein based on considerations of access density. Examples of storage disks that may be used as storage resources within a storage array of a tier may include sets of Serial Advanced Technology Attachment (SATA) disks, Fibre Channel (FC) disks and/or Enterprise Flash Disk (EFD) disks, among other known types of storage disks. According to an embodiment of the system described herein, a baseline or reference policy in which cost and performance are determined for making all of the storage resources of the system under test to be one type of disk. For example, the baseline determination may be for all Fiber Channel (FC) disks. Namely, a reference state is determined for all of the storage capacity of the storage array being allocated to a storage tier of FC disks. Based on the example disk options noted above, the baseline policy using FC disks may be used as a reference balance between the low-cost, low-performance SATA disks and the high-cost, high-performance EFD disks. It is noted that other types of disks may be used in connection with the system described herein and other choices for a baseline storage array configuration may also be used.

Figures 15, 16:
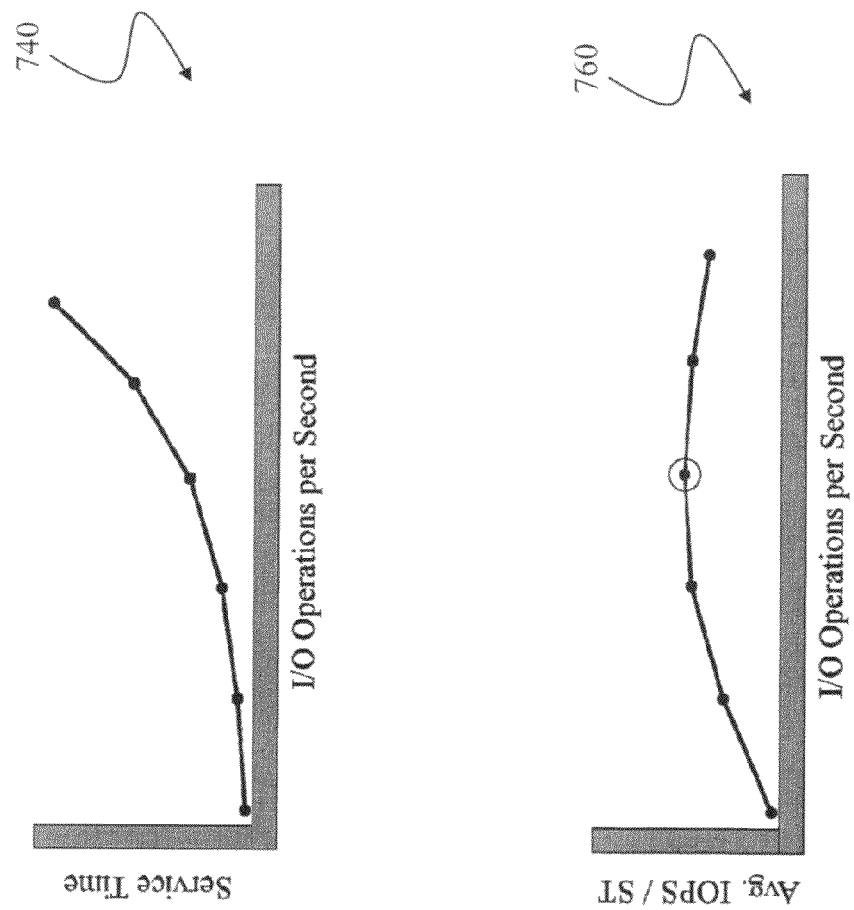
FIG. 15 is a schematic illustration of a sample disk technology performance profile plot according to an embodiment of the system described herein.
FIG. 16 is a schematic illustration of a sample disk utilization plot according to an embodiment of the system described herein.

FIG. 15 is a schematic illustration of a sample disk technology performance profile plot 740 according to an embodiment of the system described herein. The tool 700 according to the system described herein may distribute logical devices into physical disks, matching workload characteristics of the devices to the performance characteristics of the disks while using tier usage rules defined in the policies. Each disk technology has its own performance characteristics. In FIG. 15, for the sample disk, the x-axis shows the number of I/O operations per second and the y-axis represents the service time as a function of the I/O operations per second.

FIG. 16 is a schematic illustration of a sample disk utilization plot 760 according to an embodiment of the system described herein. In the embodiment, the tool 700 may look for a utilization sweet spot based on the disk technology performance characteristics, device workload and configuration settings affecting disk utilization. This sweet spot may demarcate the peak ratio of average I/Os per second to Service Time for a particular I/O rate, taking into consideration disk and workload characteristics. A sample disk utilization sweet spot is shown in FIG. 16. In an embodiment, the sweet spot optimization may be used to determine the load of individual disk groups that are each loaded until the sweet spot optimization is reached. It is noted, however, that other factors may used in determining an appropriate disk utilization that determines an optimization using the disk that is other than that indicated by the sweet spot, in accordance with factors as further discussed elsewhere herein.

Figure 17:
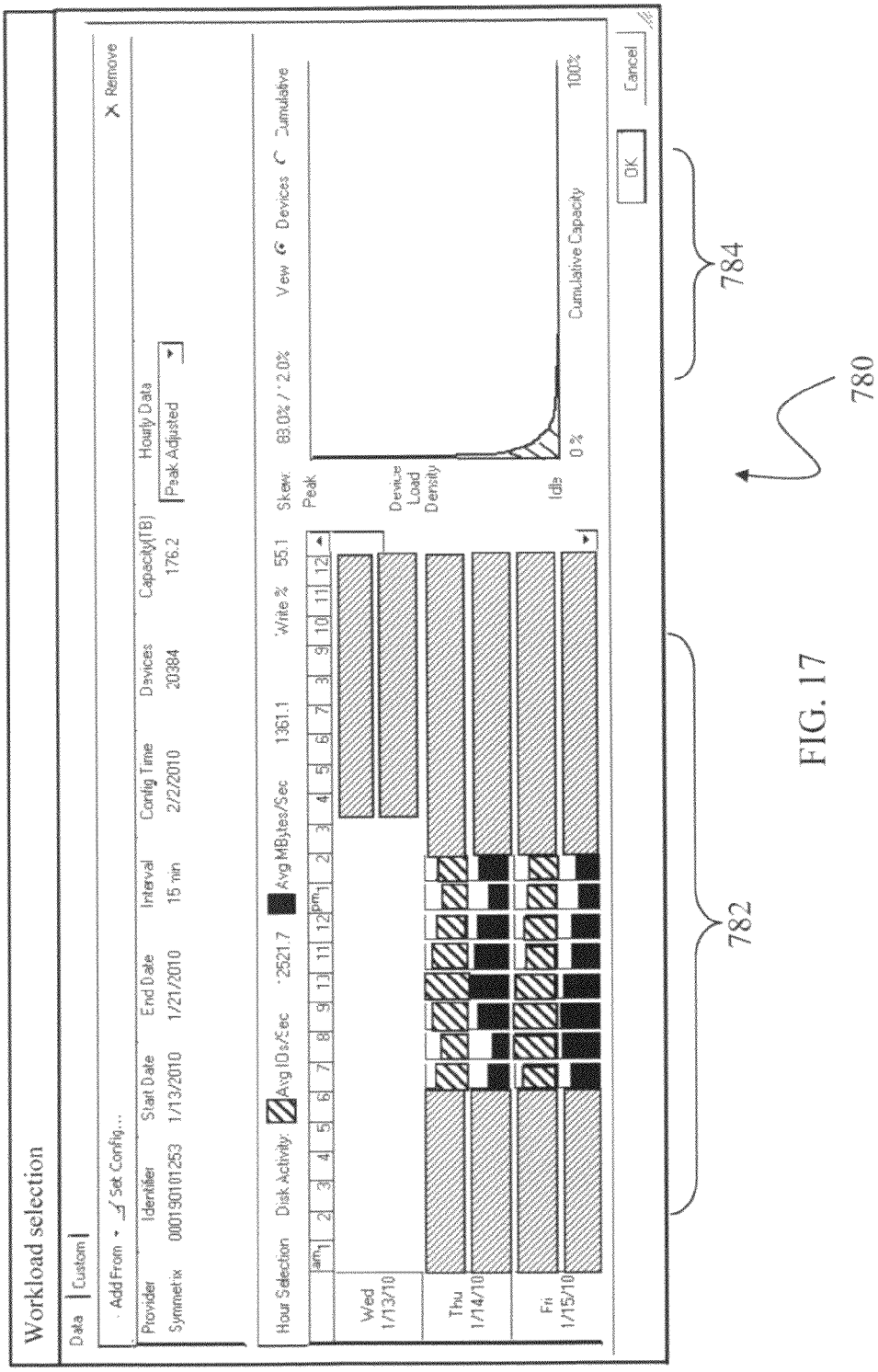
FIG. 17 is a schematic illustration of a display of workload selection for a storage policy that corresponds to a particular selected time interval for analysis.

FIG. 17 is a schematic illustration of a display 780 of workload selection for a storage policy that corresponds to a particular selected time interval for analysis. In an embodiment, the system described herein may provide for an optimization analysis that is based on a specific time interval that is monitored over a period of time. Specifically, a storage array may be analyzed for storage tier optimization for particular periods of time when the storage array is most actively used. For example, as illustrated, a selected time interval for analysis of the workload statistics according to the system described herein may include the time interval of 7:00 AM to 2:00 PM over a span of 7 days, but excluding Saturday. The system may be configurable for any desired time interval and number of days for analysis. In the illustrated data analysis screen 782, the workload statistics data includes Avg. IOs/Sec and Avg. Mbytes/Sec for the disk activity of the monitored disks. In this example, the skew chart 784 on the right panel indicates that 88% of all I/Os being executed are within 12% of used capacity for the indicated time interval and total days.

After allocating logical devices to specific storage tiers, and abiding by user-defined storage policies, the tool 700 according to the system described herein may output performance results of the optimized system. For example, the results may include estimated performance, cost, power consumption, capacity, disk count and relative disk server time versus I/O of modified storage arrays. Multiple results may be output corresponding to multiple storage policies. As further discussed herein, the results that are output may be relative to a baseline reference policy. For example, the relative results may be determined with respect to a reference array of all FC disks. Other reference policies may be used in connection with the system described herein.

Figure 18:
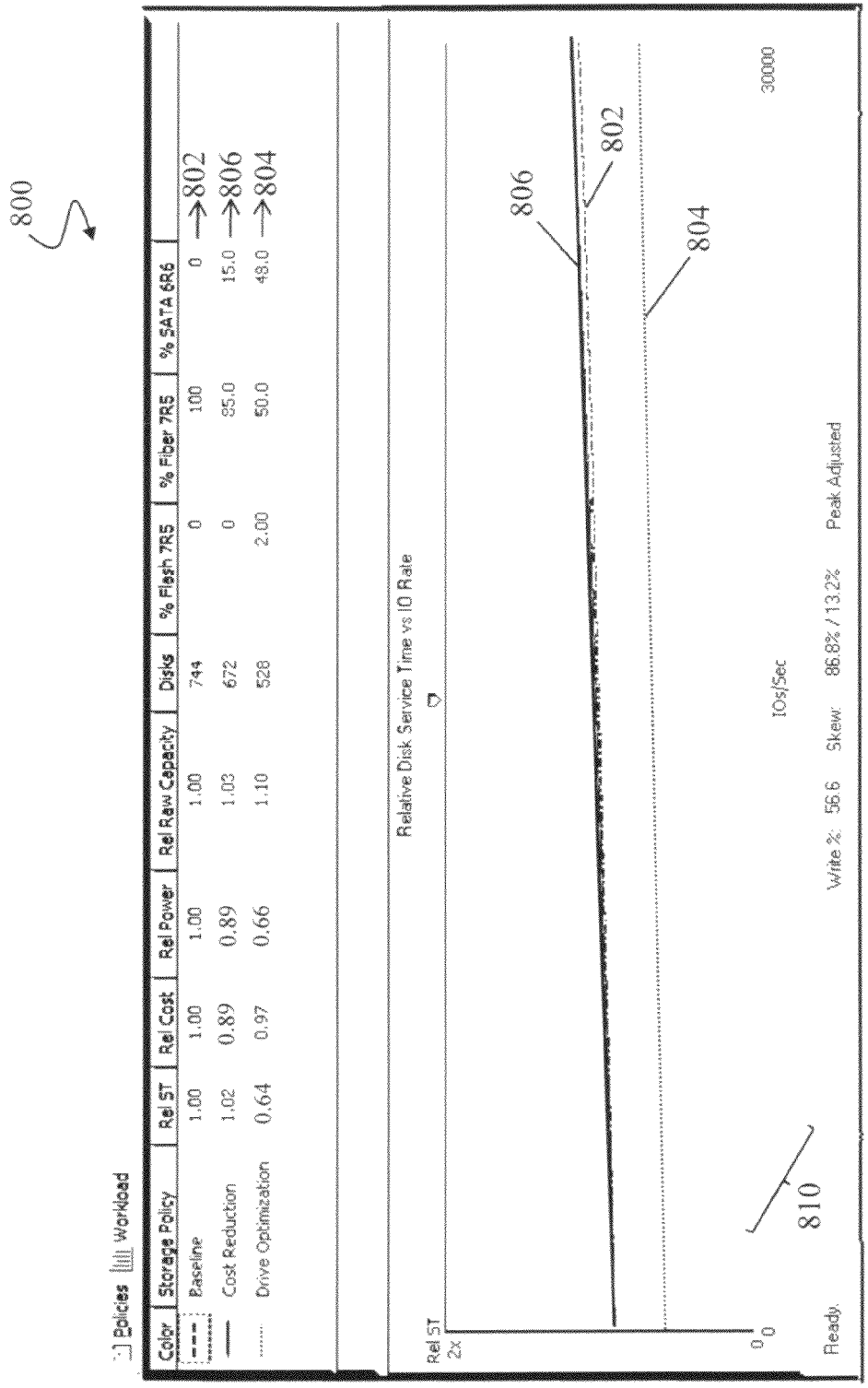
FIG. 18 is a sample output generated by the tool according to an embodiment of the system described herein.

FIG. 18 is a sample output 800 that may be generated and displayed by the tool 700 according to an embodiment of the system described herein. The shown analysis is performed for a storage array having a skew of 86.8%/13.2% (86.8% of the I/Os are executed by 13.8% of the logical devices) with a write percentage of the I/Os of 56.6%. In the embodiment, with respect to a baseline policy of 100% storage capacity in one tier of FC disks, the tool used a drive optimization policy 804 performed according to the system described herein to determine that 2% of the capacity be allocated to flash drives in one tier (shown as % Flash 7R5), 50% be allocated to FC disks in another tier (shown as % Fiber 7R5), and 48% be allocated to a SATA tier (shown as % SATA 6R6). As further discussed elsewhere herein, the optimized system may be determined by the tool 700 according to workload statistics concerning the use of logical devices of the storage array that are obtained or otherwise provided to the tool, for example by EMC's WLA. The tool 700 may then process the data and match logical devices of the system to the disk drives according to the optimization policy. The performance results may then be calculated according to the optimized system as compared to the baseline policy 802.

As shown in the sample output 800, the relative disk service time in the drive optimization policy 804 is 0.64 compared to the baseline policy 804 of 1.0, meaning that the estimated response time of the optimized drive mix may be 36% lower than the baseline policy. Similarly, the relative power consumption of the disk drives is reduced 34% and the cost of acquisition of the drives is reduced by 3% in the drive optimization policy 804 compared to the baseline policy 802. As shown, the drive optimization policy uses five hundred twenty eight (528) disks while the baseline policy uses seven hundred forty-four (744) disks. It is also noted that the relative raw disk capacity in the drive optimization policy is 10% higher. The increase in raw disk capacity may happen as a result of a change in the RAID protection. For example moving from a RAID 5 7+1 to RAID 6 6+2 consumes more raw space. It is noted that the increase in raw capacity may also happen by limiting the available capacity size (short stroking) of devices to accommodate the I/O workload.

The sample output 800 may also compare optimization results for a different policy. For example, illustrated are the results for a cost reduction policy 806. As illustrated, the estimated system of the cost reduction policy 806 is composed of a 85% FC disk tier and a 15% SATA disk tier. The estimated cost reduction policy system shows a 2% increase in the relative service time with an 11% decrease in both relative cost and relative power consumption compared to the baseline policy system 802.

The plot 810 in the bottom panel of the output 800 shows the effect on relative service time of increasing or decreasing the I/O rate on the systems of the baseline policy 802, drive optimization policy 804 and cost reduction policy 806. The data of the policies noted herein is, for example, analyzed at the I/O rate indicated by the I/O rate marker.

FIG. 19 is a flow diagram 900 showing multi-tier storage array management processing according to an embodiment of the system described herein. At a step 902, a tool 700 according to the system described herein obtains or is otherwise provided with workload statistics and/or other data about a storage array. The workload data may correspond to an analysis of the workload profiles of logical devices that perform I/Os in the storage array being analyzed. As further discussed elsewhere herein, the workload data may be manually input and/or may be obtained from analytical tools such as the EMC Workload Analyzer (WLA) and/or the Symmetrix® CLI statistics collection daemon (STP), among other possible collection devices, applications or tools. After the step 902, processing proceeds to a step 904 where the workload data is analyzed. After the step 904, processing proceeds to a step 906 where storage policy for evaluation is determined. For example, a storage policy may be applied for disk optimization and/or cost reduction, among other appropriate user-defined storage policies. It is also noted that the optimization storage policies may conform to other user requirements, including, for example, a change in RAID protection level, to provide desired levels of data redundancy and reliability. After the step 906, processing proceeds to a step 908 where the system determines a disk configuration of tiers for the optimized storage array according to the user-defined storage policy and workload data. As further discussed elsewhere herein, the tier configuration may be determined according to use of the workload statistics in connection with access density determinations. Furthermore, the tool 700 may also allow for user adjustments to fine tune storage tier configurations in connection with an embodiment of the system described herein.

After the step 908, processing proceeds to a step 910 where the logical devices of the system being profiled according to the workload statistics are matched to the drives of the storage tiers in the optimized storage array. After the step 910, processing proceeds to a step 912 where the differences of the optimized storage array are calculated with respect to a reference policy storage array. After the step 912, processing proceeds to a step 914 where the results are output, for example displayed to a user. After the step 914, processing proceeds to a test step 916 where it is determined if the analysis should be performed according to a different storage policy. If so, then processing proceeds back to the step 906. If at the test step 916 it is determined that no other policy analysis is required, then processing is complete.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of analyzing storage management in a multi-tier storage environment, comprising:
    obtaining workload data of a storage array under analysis;
    analyzing the workload data;
    determining a configuration of storage tiers of an optimized storage array; and
    displaying the performance characteristics of the optimized storage array.

2. The method according to claim 1, further comprising:
    matching logical devices corresponding to the workload data to the storage tiers of the optimized storage array; and
    determining performance characteristics of the optimized storage array.

3. The method according to claim 1, wherein analyzing the workload data includes determining a percentage of input/output (I/O) operations that are executed by a percentage of the logical devices.

4. The method according to claim 3, wherein the percentage of I/O operations and the percentage of logical devices conform to the Pareto principle.

5. The method according to claim 3, wherein analyzing the workload data is performed iteratively.

6. The method according to claim 1, wherein determining the configuration of storage tiers of the optimized storage array include applying a storage policy.

7. The method according to claim 1, wherein the performance characteristics of the optimized storage array are determined with respect to a reference storage array.

8. The method according to claim 1, wherein the storage tiers of the optimized storage array include different types of storage disk drives.

9. The method according to claim 1, wherein analyzing the workload data includes determining a peak ratio of average I/Os per second to service time.

10. A non-transitory computer readable storage medium storing computer software that analyzes storage management in a multi-tier storage environment, the computer software comprising:
    executable code that obtains workload data of a storage array under analysis;
    executable code that analyzes the workload data;
    executable code that determines a configuration of storage tiers of an optimized storage array; and
    executable code that displays the performance characteristics of the optimized storage array.

11. The computer readable storage medium according to claim 10, further comprising:
    executable code that matches logical devices corresponding to the workload data to the storage tiers of the optimized storage array; and
    executable code that determines performance characteristics of the optimized storage array.

12. The computer readable storage medium according to claim 11, wherein the percentage of I/O operations and the percentage of logical devices conform to the Pareto principle.

13. The computer readable storage medium according to claim 10, wherein the executable code that analyzes the workload data includes executable code that determines a percentage of input/output (I/O) operations that are executed by a percentage of the logical devices.

14. The computer readable storage medium according to claim 13, wherein analyzing the workload data is performed iteratively.

15. The computer readable storage medium according to claim 10, wherein the executable code that determines the configuration of storage tiers of the optimized storage array includes executable code that applies a storage policy.

16. The computer readable storage medium according to claim 10, wherein the performance characteristics of the optimized storage array are determined with respect to a reference storage array.

17. The computer readable storage medium according to claim 10, wherein the storage tiers of the optimized storage array include different types of storage disk drives.

18. The computer readable storage medium according to claim 10, wherein executable code that analyzes the workload data includes executable code that determines a peak ratio of average I/Os per second to service time.

19. A method for providing an optimized storage array, comprising:
   determining a configuration of storage tiers of the optimized storage array based on workload data from a storage array under analysis and according to a storage policy;
   matching logical devices corresponding to the workload data to the storage tiers of the optimized storage array; and
   analyzing performance of the optimized storage array; and
   displaying the performance characteristics of the optimized storage array.

20. The method according to claim 19, wherein the performance of the optimized storage array is analyzed in comparison to a reference storage array.

* * * * *